(12) United States Patent
Delgado Ortega

(10) Patent No.: US 12,157,510 B2
(45) Date of Patent: Dec. 3, 2024

(54) HAND TRUCK ASSEMBLY

(71) Applicant: Jesus Delgado Ortega, Anaheim, CA (US)

(72) Inventor: Jesus Delgado Ortega, Anaheim, CA (US)

( * ) Notice: Subject to any disclaimer, the term of this patent is extended or adjusted under 35 U.S.C. 154(b) by 302 days.

(21) Appl. No.: 17/743,634

(22) Filed: May 13, 2022

(65) Prior Publication Data

US 2023/0365177 A1    Nov. 16, 2023

(51) Int. Cl.
*B62B 1/12*    (2006.01)

(52) U.S. Cl.
CPC ............ *B62B 1/12* (2013.01); *B62B 2203/07* (2013.01)

(58) Field of Classification Search
CPC .... B62B 1/04; B62B 3/02; B62B 3/06; B62B 1/12; B62B 2202/32; B62B 2203/10; B62B 1/10; B62B 1/14; B62B 2202/30; B62B 2203/13; B62B 2206/06; B62B 5/0009; B62B 5/0069; B62B 5/085; B62B 2203/07; B66F 9/00
USPC ......................................................... 280/652
See application file for complete search history.

(56) References Cited

U.S. PATENT DOCUMENTS

| | | | | |
|---|---|---|---|---|
| 2,809,047 A * | 10/1957 | Strohmaier | ............... | B62B 1/12 280/654 |
| 3,102,733 A * | 9/1963 | Burnett | ..................... | B62B 1/12 280/654 |
| 3,612,565 A * | 10/1971 | Zimmerman | ............. | B62B 1/10 280/47.24 |
| 5,669,659 A * | 9/1997 | Dittmer | .................. | A47C 13/00 D34/24 |
| 6,364,328 B1 * | 4/2002 | Stahler, Sr. | ............. | B62B 1/002 280/47.27 |
| 7,040,635 B1 * | 5/2006 | Remole | .................. | A47C 7/002 248/129 |
| 7,823,893 B2 * | 11/2010 | Meyers | ..................... | B62B 1/12 280/47.29 |
| 8,840,121 B2 * | 9/2014 | Reeves | ..................... | B62B 1/12 414/490 |
| 9,358,997 B2 * | 6/2016 | Grace, VII | ................ | B62B 1/26 |
| 10,913,473 B2 * | 2/2021 | Seagraves | ................ | B66F 9/24 |
| D919,919 S | 5/2021 | Kuhls | | |
| 11,731,677 B2 * | 8/2023 | Ellithorpe | ............. | B62B 5/0003 280/47.131 |
| 2004/0256818 A1 * | 12/2004 | Amsili | .................... | B62B 1/125 280/47.29 |

(Continued)

FOREIGN PATENT DOCUMENTS

WO    WO2018067127    4/2018

*Primary Examiner* — James A Shriver, II
*Assistant Examiner* — Hilary L Johns

(57) ABSTRACT

A hand truck assembly includes a hand truck that has a pair of members, a pair of wheels rotatably disposed on the members and a nose plate extending forwardly from the pair of members. The nose plate can be positioned beneath an object to transport the object. Each of the members has a plurality of engagement points being distributed along the members and a shelf unit is slidably attached to the members. The shelf unit releasably engages respective ones of the engagement points on the members for retaining the shelf unit at a selected point along the members. In this way the shelf unit can engage an object that has an elevated lift point to transport the object that has the elevated lift point.

5 Claims, 6 Drawing Sheets

(56) References Cited

U.S. PATENT DOCUMENTS

| | | | |
|---|---|---|---|
| 2008/0203688 A1* | 8/2008 | Meyers | B62B 1/266 |
| | | | 280/47.29 |
| 2015/0035259 A1* | 2/2015 | Umbro | B62B 5/065 |
| | | | 280/654 |
| 2015/0259002 A1* | 9/2015 | Reddi | B62B 1/04 |
| | | | 280/47.18 |
| 2022/0315078 A1* | 10/2022 | Ellithorpe | B62B 5/0003 |

* cited by examiner

HAND TRUCK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hand truck devices and more particularly pertains to a new hand truck device for lifting and transporting an object with an elevated lift point. The device includes a hand truck that has wheels, a nose plate and a plurality of engagement points being vertically distributed on the hand truck. The device includes a shelf unit that is slidably integrated into the hand truck and which releasably engages a respective engagement point for retaining the shelf unit at a desired height on the hand truck. In this way the shelf unit can engage an object that has an elevated lifting point for transporting the object with the elevated lifting point.

(2) Description of Related Art Including Information Disclosed Under 37 CFR 1.97 and 1.98

The prior art relates to hand truck devices including a foldable chair that includes a vertical frame with a plurality of engagement points and a chair that is slidably disposed on the vertical frame and which engages a respective engagement point for retaining the chair at a desired height on the vertical frame. The prior art discloses a hand truck that includes a pivotable nose plate such that the pivotable nose plate can be oriented in an upward angle for engaging an object with an elevated lift point. The prior art discloses a hand truck that has an elevated nose plate for engaging an object with an elevated lift point. The prior art discloses a variety of hand truck devices which each includes a chair that is pivotally disposed on the hand truck to facilitate a user to be seated on the chair. The prior art discloses a hand truck that includes a shelf unit that is slidably disposed on the hand truck and a hand crank that is disposed on the hand truck and which lifts or lowers the shelf unit. The prior art discloses a hand truck that includes a motorized shelf unit that travels upwardly or downwardly on the hand truck and a sensor which senses eye level of a user to subsequently position the motorized shelf unit at the user's elbow height.

BRIEF SUMMARY OF THE INVENTION

An embodiment of the disclosure meets the needs presented above by generally comprising a hand truck that has a pair of members, a pair of wheels rotatably disposed on the members and a nose plate extending forwardly from the pair of members. The nose plate can be positioned beneath an object to transport the object. Each of the members has a plurality of engagement points being distributed along the members and a shelf unit is slidably attached to the members. The shelf unit releasably engages respective ones of the engagement points on the members for retaining the shelf unit at a selected point along the members. In this way the shelf unit can engage an object that has an elevated lift point to transport the object that has the elevated lift point.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
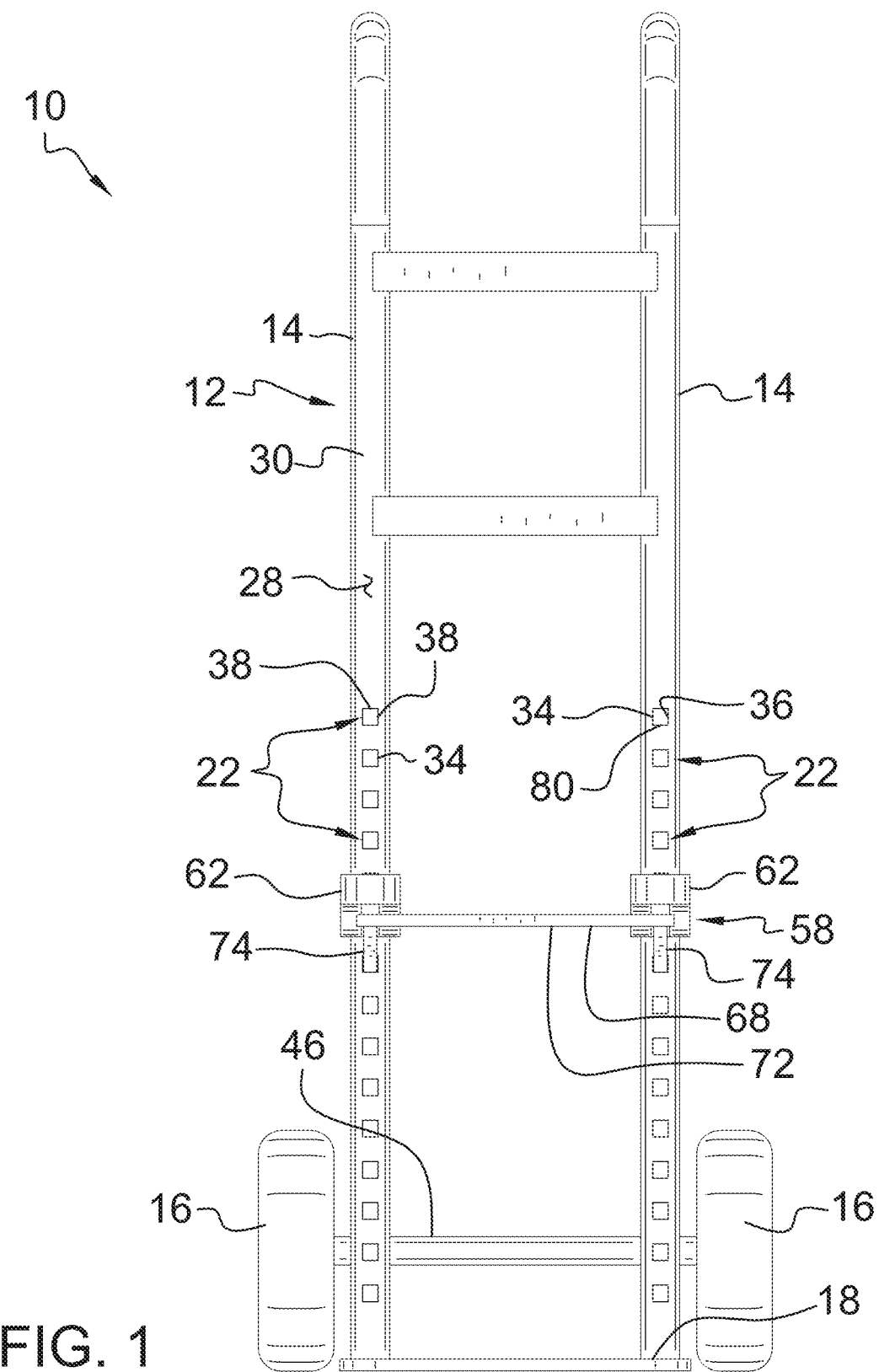
FIG. 1 is a front view of a hand truck assembly according to an embodiment of the disclosure.
Figure 2:
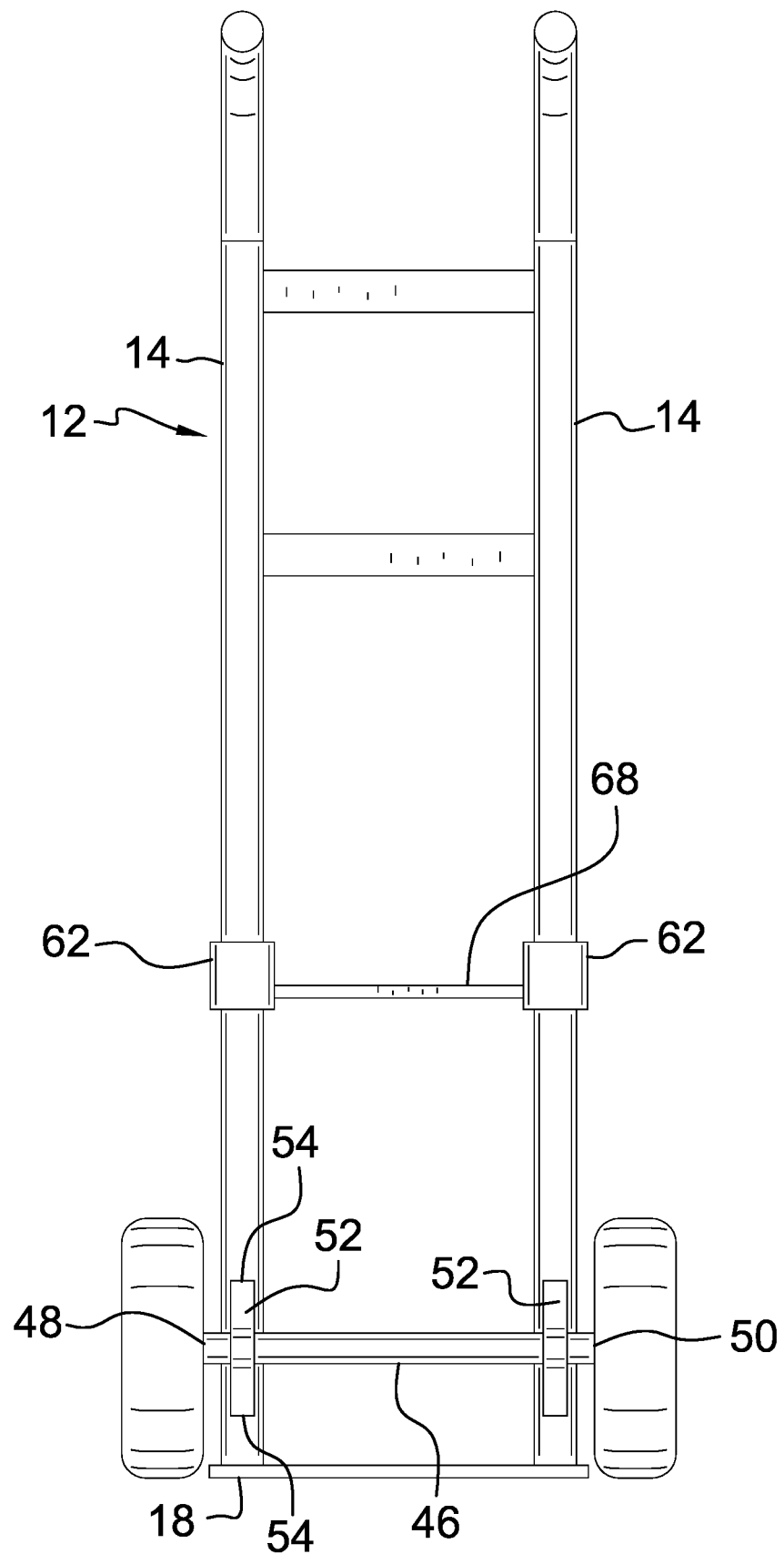
FIG. 2 is a back view of an embodiment of the disclosure.
Figure 3:
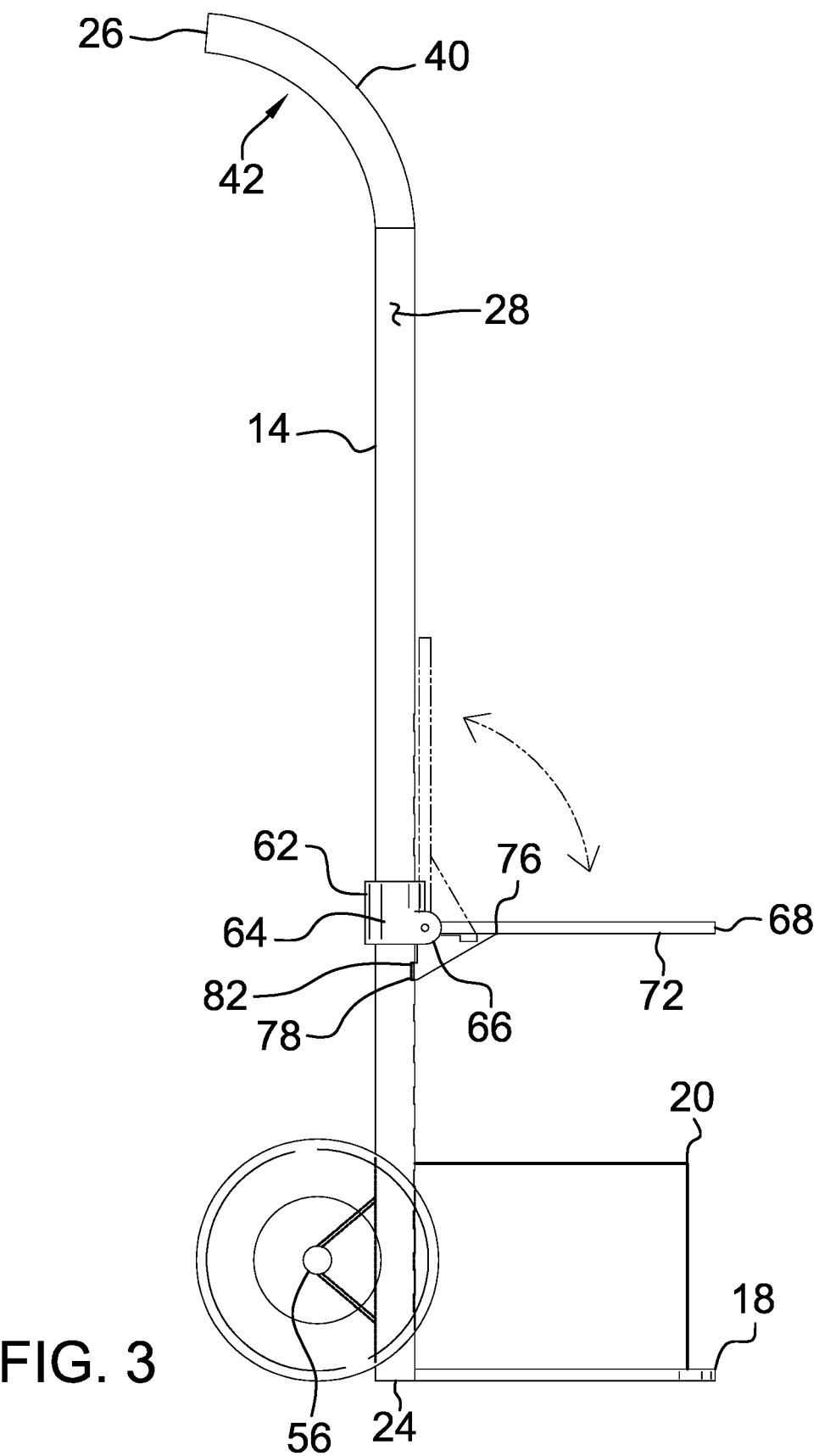
FIG. 3 is a right side view of an embodiment of the disclosure.
Figure 4:
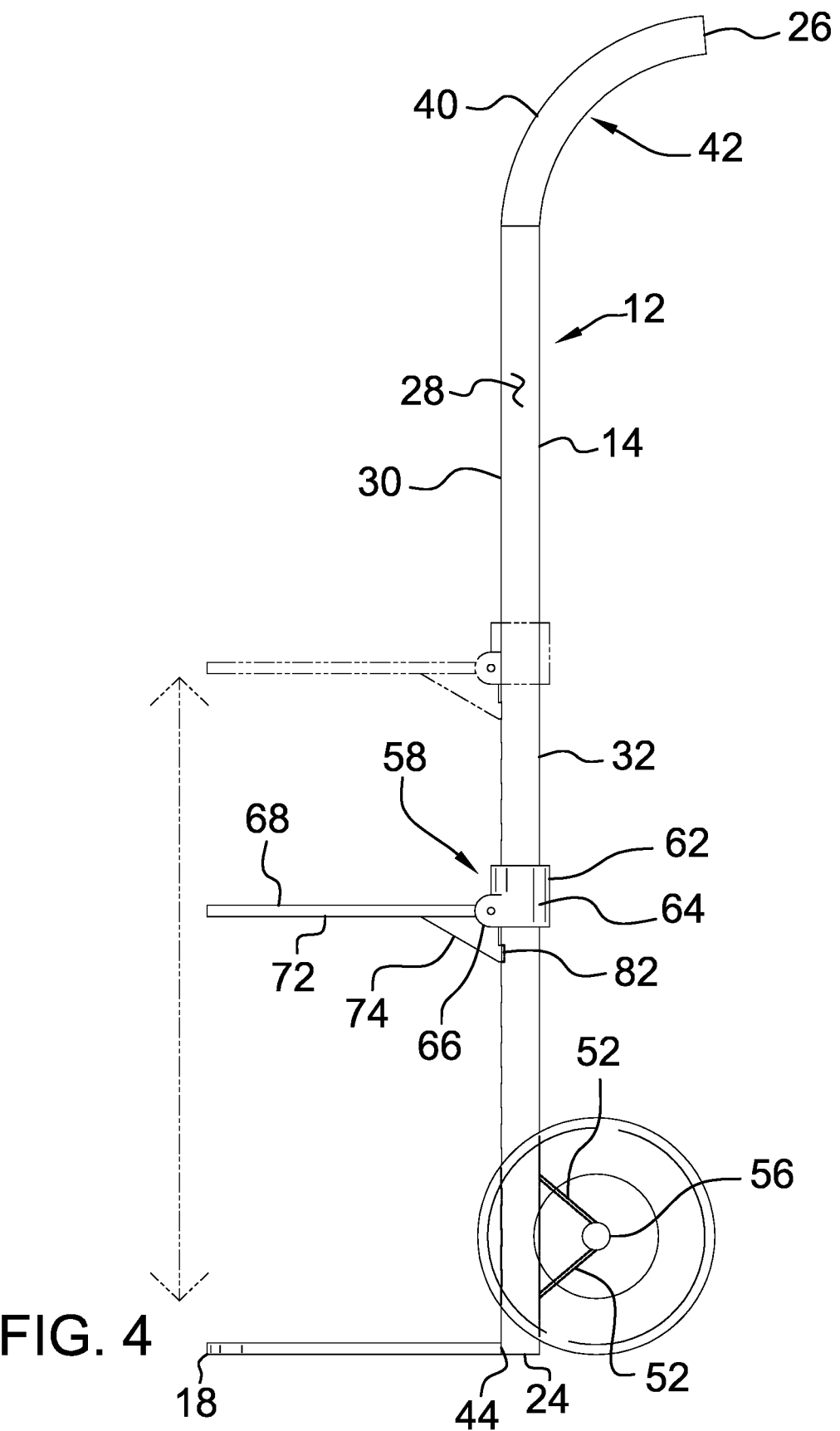
FIG. 4 is a left side view of an embodiment of the disclosure.
Figure 5:
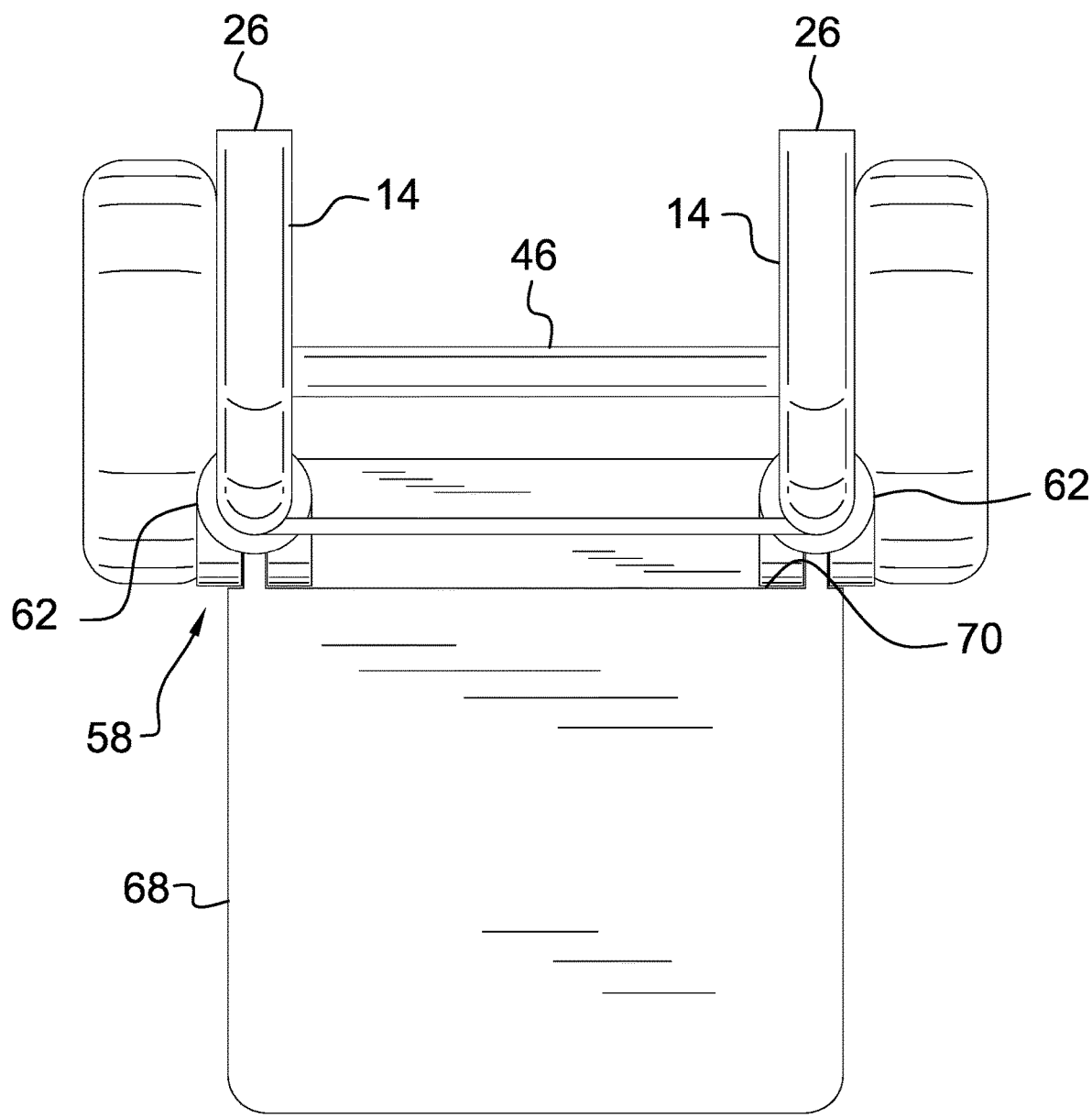
FIG. 5 is a top view of an embodiment of the disclosure.
Figure 6:
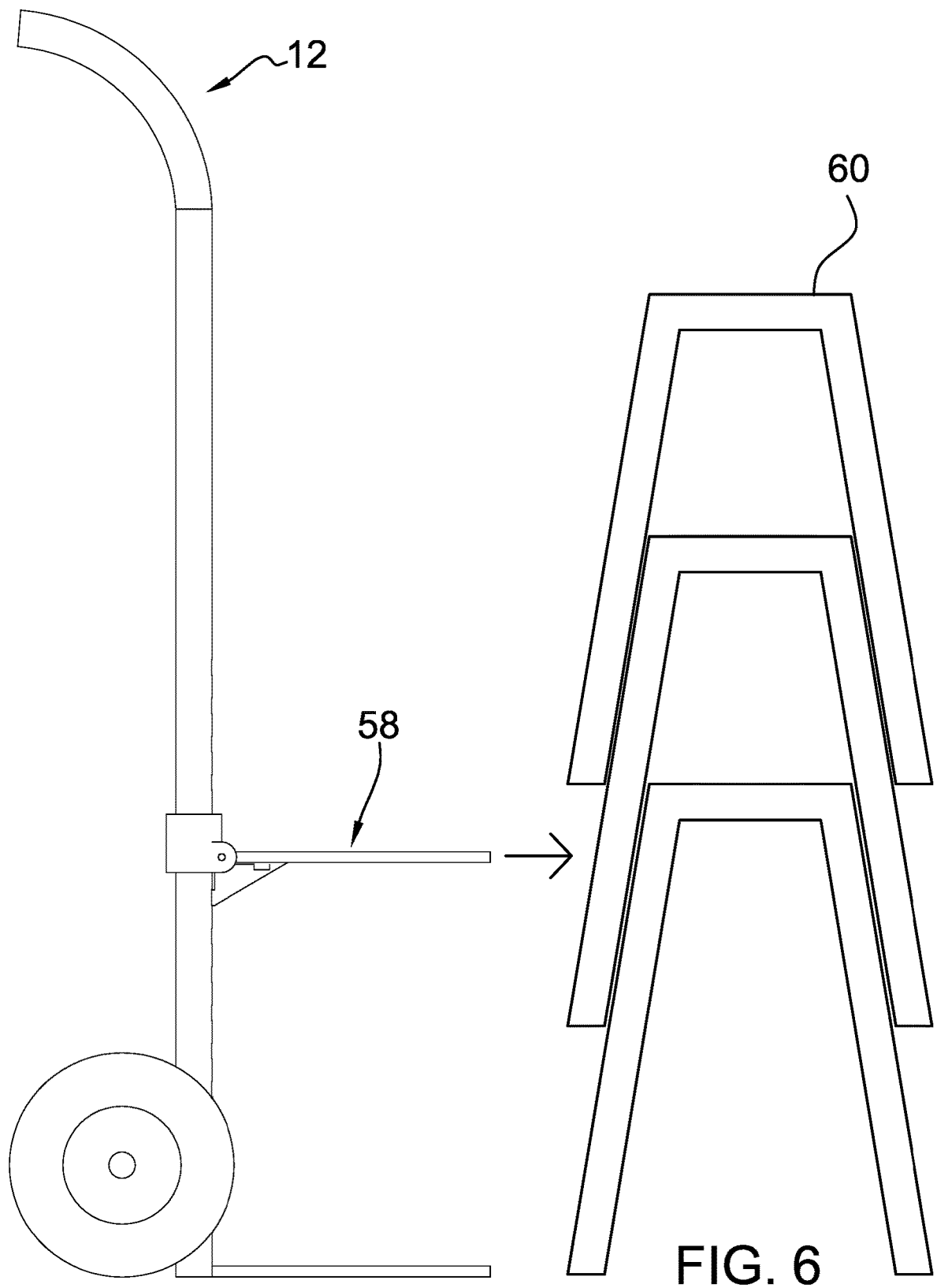
FIG. 6 is a perspective in-use view of an embodiment of the disclosure.

With reference now to the drawings, and in particular to FIGS. 1 through 6 thereof, a new hand truck device embodying the principles and concepts of an embodiment of the disclosure and generally designated by the reference numeral 10 will be described.

As best illustrated in FIGS. 1 through 6, the hand truck assembly 10 generally comprises a hand truck 12 that has a pair of members 14, a pair of wheels 16 rotatably disposed on the members 14 and a nose plate 18 extending forwardly from the pair of members 14. The nose plate 18 can be positioned beneath an object 20 to transport the object 20 and each of the members 14 has a plurality of engagement points 22 that are distributed along the members 14. Each of the members 14 has a bottom end 24, a top end 26 and an outer surface 28 extending between the top end 26 and the bottom end 24, and the outer surface 28 has a front side 30 and a back side 32. Each of the members 14 has a plurality of openings 34 each extending through the front side 30 of the outer surface 28. The openings 34 are spaced apart from each other and are distributed from a point located adjacent to the bottom end 24 toward the top end 26 such that the plurality of openings 34 defines the plurality of engagement points 22. Furthermore, each of the openings 34 has a bounding edge 36 and the bounding edge 36 of each of the openings 34 has a plurality of intersecting sides 38 such that each of the openings 34 has a rectangular shape.

Each of the members 14 has a curve 40 that is positioned adjacent to the top end 26 such that the top end 26 is directed rearwardly thereby defining a handle 42 for gripping to manipulate the hand truck 12. The nose plate 18 has a rear edge 44 and the rear edge 44 is attached to the front side 30 of the outer surface 28 of each of the members 14 at a point located adjacent to the bottom end 24 of the members 14. Moreover, the nose plate 18 lies on a plane that is perpendicularly oriented with an axis extending between the bottom end 24 and the top end 26 of the members 14.

An axle 46 is provided that has a primary end 48 and a secondary end 50, and the axle 46 is elongated between the primary end 48 and the secondary end 50. The axle 46 has a plurality of brackets 52 each angling away from the axle 46; respective ones of the brackets 52 angles upwardly from the axle 46 and respective ones of the brackets 52 angles downwardly from the axle 46. Each of the brackets 52 has a distal end 54 with respect to the axle 46 and the distal end 54 of each of the brackets 52 is attached to the back side 32 of the outer surface 28 of a respective one of the members 14 such that the axle 46 is perpendicularly oriented with the pair of members 14. The axle 46 is located at a point is positioned proximate the bottom end 24 of the members 14, and a hub 56 of each of the wheels 16 is rotatably disposed on a respective one of the primary end 48 and the secondary end 50 of the axle 46.

A shelf unit 58 is provided and the shelf unit 58 is slidably attached to the members 14. The shelf unit 58 releasably engages respective ones of the engagement points 22 on the members 14 for retaining the shelf unit 58 at a selected point along the members 14. In this way the shelf unit 58 to engage an object that has an elevated lift point 60 to facilitate the hand truck 12 to transport the object that has the elevated lift point 60. The object with the elevated lift point 60 may be a stack of chairs, for example, or any other object that has a lift point that is spaced upwardly from a support surface upon which the object is positioned.

The shelf unit 58 comprises a pair of collars 62 that is each of the collars 62 is slidably positioned around a respective one of the members 14. Each of the collars 62 has an outer wall 64 and each of the collars 62 has a pivot point 66 that is integrated into the outer wall 64. The pivot point 66 on the outer wall 64 of each of the collars 62 is directed away from the front side 30 of the outer surface 28 of the respective member. The shelf unit 58 includes a shelf 68 has a back edge 70 and a bottom surface 72 and the back edge 70 pivotally engages the pivot point 66 on the outer wall 64 of each of the collars 62. The shelf 68 is positionable in a deployed position having the shelf 68 extending forwardly from the pair of collars 62 and the shelf 68 is positionable in a stored position having the shelf 68 extending upwardly from the collars 62.

The shelf unit 58 includes a pair of braces 74 is provided and each of the braces 74 has a coupled end 76 and a free end 78. The coupled end 76 of each of the braces 74 is pivotally coupled to the bottom surface 72 of the shelf 68 and each the braces 74 is aligned with a respective one of the collars 62. The free end 78 of each of the braces 74 extends into a respective one of the openings 34 in the outer surface 28 of a respective one of the members 14 for retaining the shelf 68 at a desired height on the members 14. The free end 78 of the braces 74 abuts a lowermost one 80 of the intersecting sides 38 of the bounding edge 36 of the respective opening for retaining the shelf 68 in the deployed position. In this way the shelf 68 can support the weight of the object with the elevated lift point 60. As is most clearly shown in FIGS. 3 and 4, each of the braces 74 includes a foot 82 that extends rearwardly from the free end 78 and which extends into the respective opening 34.

In use, the shelf 68 is positioned in the stored position to facilitate the hand truck 12 to be employed in the conventional manner having the nose plate 18 carrying an object 20. The shelf 68 is positioned in the deployed position and the collars 62 are positioned at a desired location on the members 14 to position the shelf 68 at the appropriate height to engage the object with the elevated lift point 60. Additionally, the braces 74 are engaged into the respective openings 34 to retain the shelf 68 at the appropriate height. In this way the shelf 68 can be employed to lift and subsequently transport the object with the elevated lift point 60 that the nose plate 18 would not be capable of lifting.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hand truck assembly for carrying objects of various heights, said assembly comprising:
   a hand truck having a pair of members, a pair of wheels rotatably disposed on said members and a nose plate extending forwardly from said pair of members wherein said nose plate is configured to be positioned beneath an object to transport the object, each of said members having a plurality of engagement points being distributed along said members;
   a shelf unit being slidably attached to said members, said shelf unit releasably engaging respective ones of said engagement points on said members for retaining said shelf unit at a selected point along said members thereby facilitating said shelf unit to engage an object that has an elevated lift point wherein said hand truck is configured to transport the object that has the elevated lift point;

wherein each of said members has a bottom end, a top end and an outer surface extending between said top end and said bottom end, said outer surface having a front side and a back side;

wherein each of said members has a plurality of openings each extending through said front side of said outer surface, said openings being spaced apart from each other and being distributed from a point located adjacent to said bottom end toward said top end such that said plurality of openings defines said plurality of engagement points, each of said openings having a bounding edge, said bounding edge of each of said openings having a plurality of intersecting sides such that each of said openings has a rectangular shape;

wherein each of said members has a curve being positioned adjacent to said top end such that said top end is directed rearwardly thereby defining a handle for gripping to manipulate said hand truck;

wherein said nose plate has a rear edge, said rear edge being attached to said front side of said outer surface of each of said members at a point located adjacent to said bottom end of said members, said nose plate lying on a plane being perpendicularly oriented with an axis extending between said bottom end and said top end of said members;

wherein said shelf unit comprises a pair of collars, each of said collars being slidably positioned around a respective one of said members, each of said collars having an outer wall, each of said collars having a pivot point being integrated into said outer wall, said pivot point on said outer wall of each of said collars being directed away from said front side of said outer surface of said respective member; and wherein said shelf unit includes a shelf having a back edge and a bottom surface, said back edge pivotally engaging said pivot point on said outer wall of each of said collars, said shelf being positionable in a deployed position having said shelf extending forwardly from said pair of collars, said shelf being positionable in a stored position having said shelf extending upwardly from said collars.

2. The assembly according to claim 1, further comprising:

an axle having a primary end and a secondary end, said axle being elongated between said primary end and said secondary end;

said axle has a plurality of brackets each angling away from said axle, respective ones of said brackets angling upwardly from said axle and respective ones of said brackets angling downwardly from said axle, each of said brackets having a distal end with respect to said axle;

said distal end of each of said brackets being attached to said back side of said outer surface of a respective one of said members such that said axle is perpendicularly oriented with said pair of members, said axle being located at a point being positioned proximate said bottom end of said members; and a hub of each of said wheels is rotatably disposed on a respective one of said primary end and said secondary end of said axle.

3. The assembly according to claim 1, wherein said shelf unit includes a pair of braces, each of said braces having a coupled end and a free end, said coupled end of each of said braces being pivotally coupled to said bottom surface of said shelf, each said braces being aligned with a respective one of said collars.

4. The assembly according to claim 3, wherein said free end of each of said braces extends into a respective one of said openings in said outer surface of a respective one of said members for retaining said shelf at a desired height on said members, said free end of said braces abutting a lowermost one of said intersecting sides of said bounding edge of said respective opening for retaining said shelf in said deployed position wherein said shelf is configured to support the weight of the object with the elevated lift point.

5. A hand truck assembly for carrying objects of various heights, said assembly comprising:

a hand truck having a pair of members, a pair of wheels rotatably disposed on said members and a nose plate extending forwardly from said pair of members wherein said nose plate is configured to be positioned beneath an object to transport the object, each of said members having a plurality of engagement points being distributed along said members, each of said members having a bottom end, a top end and an outer surface extending between said top end and said bottom end, said outer surface having a front side and a back side, each of said members having a plurality of openings each extending through said front side of said outer surface, said openings being spaced apart from each other and being distributed from a point located adjacent to said bottom end toward said top end such that said plurality of openings defines said plurality of engagement points, each of said openings having a bounding edge, said bounding edge of each of said openings having a plurality of intersecting sides such that each of said openings has a rectangular shape, each of said members having a curve being positioned adjacent to said top end such that said top end is directed rearwardly thereby defining a handle for gripping to manipulate said hand truck, said nose plate having a rear edge, said rear edge being attached to said front side of said outer surface of each of said members at a point located adjacent to said bottom end of said members, said nose plate lying on a plane being perpendicularly oriented with an axis extending between said bottom end and said top end of said members;

an axle having a primary end and a secondary end, said axle being elongated between said primary end and said secondary end, said axle having a plurality of brackets each angling away from said axle, respective ones of said brackets angling upwardly from said axle and respective ones of said brackets angling downwardly from said axle, each of said brackets having a distal end with respect to said axle, said distal end of each of said brackets being attached to said back side of said outer surface of a respective one of said members such that said axle is perpendicularly oriented with said pair of members, said axle being located at a point being positioned proximate said bottom end of said members, a hub of each of said wheels being rotatably disposed on a respective one of said primary end and said secondary end of said axle; and a shelf unit being slidably attached to said members, said shelf unit releasably engaging respective ones of said engagement points on said members for retaining said shelf unit at a selected point along said members thereby facilitating said shelf unit to engage an object that has an elevated lift point wherein said hand truck is configured to transport the object that has the elevated lift point, said shelf unit comprising:

a pair of collars, each of said collars being slidably positioned around a respective one of said members, each of said collars having an outer wall, each of said collars having a pivot point being integrated into said outer wall, said pivot point on said outer wall of each of said collars being directed away from said front side of said outer surface of said respective member;

a shelf having a back edge and a bottom surface, said back edge pivotally engaging said pivot point on said outer wall of each of said collars, said shelf being positionable in a deployed position having said shelf extending forwardly from said pair of collars, said shelf being positionable in a stored position having said shelf extending upwardly from said collars; and a pair of braces, each of said braces having a coupled end and a free end, said coupled end of each of said braces being pivotally coupled to said bottom surface of said shelf, each said braces being aligned with a respective one of said collars, said free end of each of said braces extending into a respective one of said openings in said outer surface of a respective one of said members for retaining said shelf at a desired height on said members, said free end of said braces abutting a lowermost one of said intersecting sides of said bounding edge of said respective opening for retaining said shelf in said deployed position wherein said shelf is configured to support the weight of the object with the elevated lift point.

* * * * *